United States Patent [19]

Nakashima

[11] Patent Number: 5,418,589
[45] Date of Patent: May 23, 1995

[54] APPARATUS FOR PROCESSING PHOTOSENSITIVE MATERIAL

[75] Inventor: Yoshihiko Nakashima, Wakayama, Japan

[73] Assignee: Noritsu Koki Co., Ltd., Wakayama, Japan

[21] Appl. No.: 249,024

[22] Filed: May 25, 1994

[30] Foreign Application Priority Data

Jun. 3, 1993 [JP] Japan .................................. 5-133320

[51] Int. Cl.⁶ ..................... G03D 13/00; G03D 3/08; G03D 13/08
[52] U.S. Cl. ..................... 354/298; 354/319; 354/339
[58] Field of Search ............... 354/297, 298, 319–324, 354/331, 336, 339; 355/27–29

[56] References Cited

U.S. PATENT DOCUMENTS

| | | | |
|---|---|---|---|
| 4,039,258 | 8/1977 | Hujer et al. | 355/27 |
| 4,864,354 | 9/1989 | Crasnianski | 354/322 X |
| 5,159,385 | 10/1992 | Imamura | 355/28 |
| 5,231,439 | 7/1993 | Takahashi et al. | 354/320 X |
| 5,307,114 | 4/1994 | Nitsch et al. | 355/29 |

FOREIGN PATENT DOCUMENTS

| | | |
|---|---|---|
| 0136979 | 10/1986 | European Pat. Off. |
| 3739719 | 6/1988 | Germany |
| 4-141646 | 5/1992 | Japan .................................. 354/320 |

OTHER PUBLICATIONS

Patent Abstracts of Japan, Nov. 20, 1981, vol. 5, No. 182.
Patent Abstracts of Japan, Dec. 21, 1983, vol. 7, No. 287.

*Primary Examiner*—D. Rutledge
*Attorney, Agent, or Firm*—Armstrong, Westerman, Hattori, McLeland & Naughton

[57] ABSTRACT

An apparatus for full-automatically processing a photosensitive material is provided which requires less installation space, realizes a higher working efficiency based on a high-speed feeding of film and thereby assures less costly processing. The apparatus includes: a film-developing part for developing individual films while feeding each of the films accompanying a leader; a printing part for subjecting a photographic paper to an exposure; a paper-developing part for developing the photographic paper exposed; and a film-sorting mechanism, disposed adjacent a terminating end of the film-developing part, for sorting the films by the kinds thereof.

5 Claims, 12 Drawing Sheets

APPARATUS FOR PROCESSING PHOTOSENSITIVE MATERIAL

BACKGROUND OF THE INVENTION

The present invention relates to an apparatus for processing a photosensitive material and, more particularly, to an apparatus for processing a photosensitive material capable of full-automatically performing the film-developing processing through the photo-printing processing.

In a conventional apparatus for processing a photosensitive material, a film-developing device and a photo-printing device are separately provided, so that an enlarged space is required for the installation of the apparatus. Further, the operation of transporting a film from the film-developing device to the photo-printing device must be performed by hand, thus resulting in a problem of infeasibility of laborsaving.

Currently, an integral processing apparatus is practically available which automatically performs the film-developing processing through the photo-printing processing. Such integral apparatus, processing however, is not adapted to allow a film to make the round of processing tanks in the film-developing device with a short leader leading the film. Further, the figure of the film being transported is maintained only relying upon the stiffness of the film. These account for problems of infeasibility of high-speed processing and unsatisfactory working efficiency.

Further, since there are four sizes of film (110, 126, 135 and 120), the film-feeding guide in a developing tank must be replaced with an alternative for each film size when films of four sizes are to be subjected to the same processing. This leads to an increase in troublesomeness and hence results in a problem of costly processing.

In view of the foregoing, it is an object of the present invention to provide a full-automatic apparatus for processing a photosensitive material which requires less space for its installation, realizes enhanced working efficiency based on high-speed feeding of film, and minimizes the cost required.

SUMMARY OF THE INVENTION

According to the present invention, there is provided an apparatus for processing a photosensitive material comprising: a film-developing part for developing individual films while feeding each of the films accompanying a leader; a printing part for subjecting a photographic paper to an exposure; a paper-developing part for developing the photographic paper exposed; and a film-sorting mechanism, disposed adjacent a terminating end of the film-developing part, for sorting the films by the kinds thereof.

Preferably, the apparatus further comprises a film-standby mechanism for causing the films to stand by for sorting and a standby tank for accommodating the films standing by, the film-standby mechanism and the standby tank being disposed upstream of the film-sorting mechanism of the film-developing part, whereby the feeding of the films is temporarily stopped so as to make the films stand by when the films are impossible to feed to the printing part.

Preferably, the film-developing part and the printing part have a film inlet and a film outlet, respectively, on an operation table of the apparatus in view of the operability of the apparatus.

Further, the film-sorting mechanism preferably comprises a sensor for detecting the kinds of the films, a cutter for detaching each of the films detected by the sensor from the leader, and a sorting guide for guiding each film detached from the leader by the cutter toward the printing part.

Still further, the film-standby mechanism preferably comprises a guide roller rotatably fixed at a location above the standby tank, and a guide plate disposed under the guide roller and movable toward and away from the guide roller, whereby when the guide plate is caused to move away from the guide roller, the film is allowed to sag down into the standby tank and to stand by therewithin.

In the present invention the apparatus for processing a photosensitive material includes the film-developing part, printing part and paper-developing part which are integrally formed and hence performs the film-developing processing through the photo-printing processing full-automatically while occupying less space for its installation.

The film-sorting mechanism disposed adjacent the terminating end of the film-developing part sorts films by the kind thereof, for example, those to be fed to the printing part and those to be fed to a storage. Each of the films to be fed to the printing part is detached from the leader just before reaching the printing part and then fed thereto, while films of the type requiring the replacement of a negative mask due to a small quantity thereof are accumulated in a stocker and are fed to the printing part later on.

Where the film-standby mechanism and the standby tank are provided just upstream of the film-sorting mechanism, they act to temporarily stop the feeding of the succeeding film and cause that film to sag down into the standby tank and to stand by for the next processing when the printing part cannot accept the film because, for example, the preceding film is fed backward for the extra-printing thereof within the printing part.

Further, where the film inlet and the film outlet are provided on the operation table, the operator is able to do operations such as insertion of the film or extra-printing thereof while seated on a chair.

DETAILED DESCRIPTION

An apparatus for processing a photosensitive material according to the present invention will now be described in detail with reference to the drawings.

Figure 1:
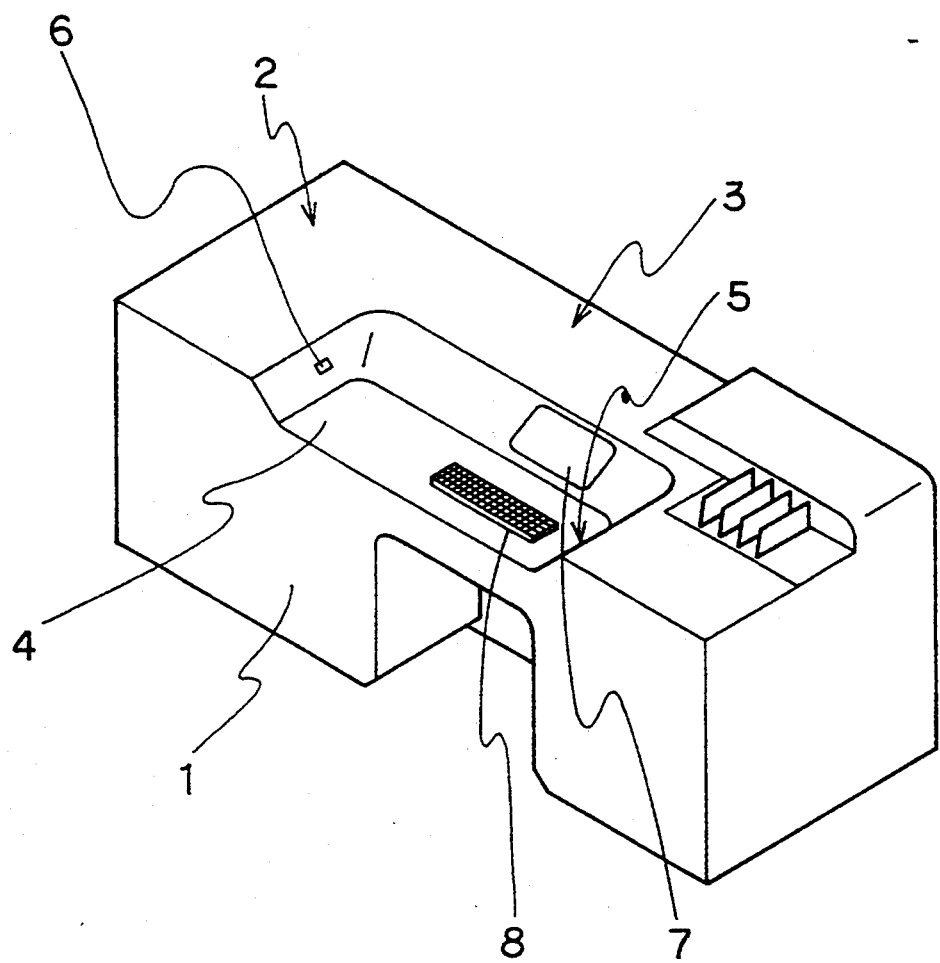
FIG. 1 is a perspective view showing the appearance of one embodiment of an apparatus for processing a photosensitive material according to the present invention.

Referring to FIG. 1, the apparatus for processing a photosensitive material includes a film-developing part 1, a printing part 2 and a paper-developing part 3 which are integrally formed and hence is capable of performing the film-developing processing through the photo-printing processing. In addition, since an operation table 4 is provided with a film inlet 5 and a film outlet 6, the operator is able to operate a keyboard 8 while watching a monitor 7, as seated on a chair. Further, the operator is able to very easily carry out operations such as to attach a leader to the leading end of a film and then insert the film into the apparatus through the film inlet 5, as to put finished prints into a pouch together with the corresponding film having been developed and as to insert a film into the film outlet against the stream for the extra-printing or for the photo-printing of a film incapable of being processed automatically.

Figure 2:
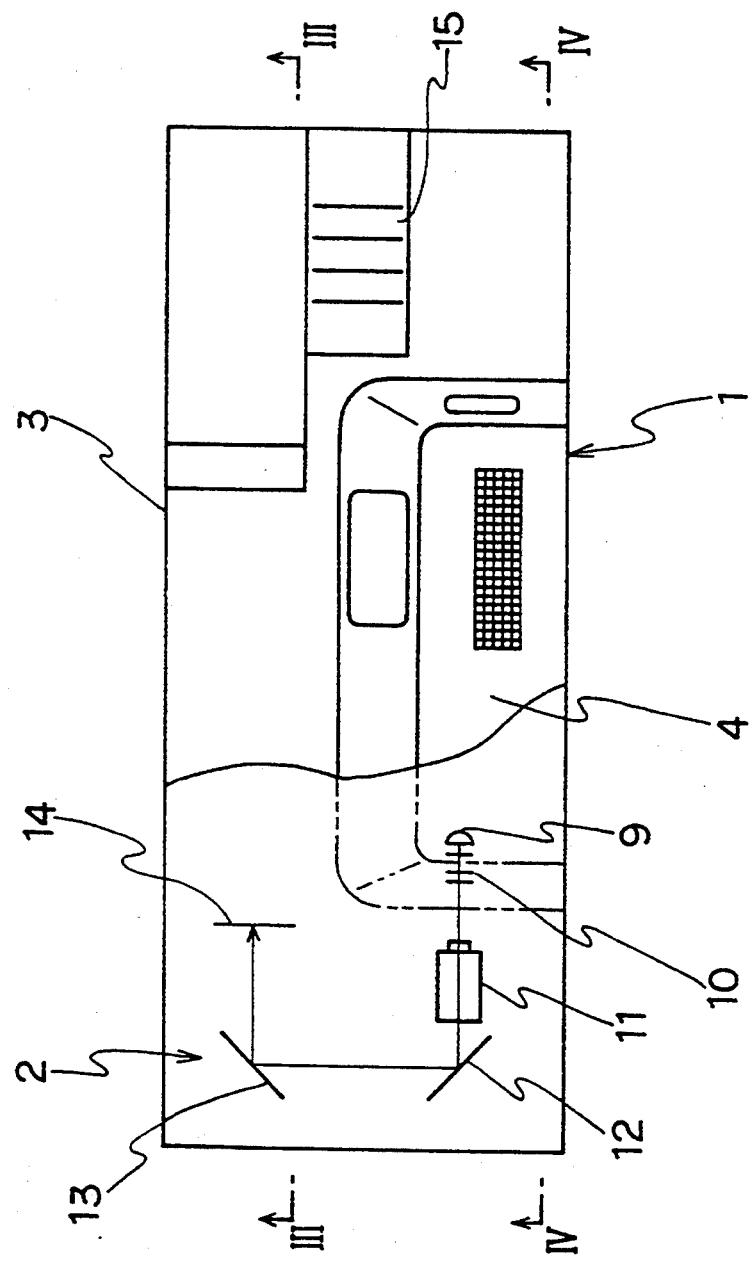
FIG. 2 is a plan view of the apparatus shown in FIG. 1.

FIG. 2 is a plan view of the apparatus shown in FIG. 1 for showing the arrangement of the film-developing part 1, printing part 2 and paper-developing part 3. The film-developing part 1 occupies the front half of the apparatus on the side where the operation table 4 is disposed, while the paper-developing part 3 occupies the rear half of the apparatus. The printing part 2 occupies the upper left portion of the apparatus as viewed in FIG. 2, wherein a film 10 being transported upward of the film-developing part 1 is exposed to light coming from a light source 9 through a lens 11 and mirrors 12 and 13 thereby printing the image of the film 10 onto a paper 14. The paper 14 developed in the paper-developing part 3 is cut into individual frames, which are then sorted for each order by an order sorter 15 and ejected.

Figure 3:
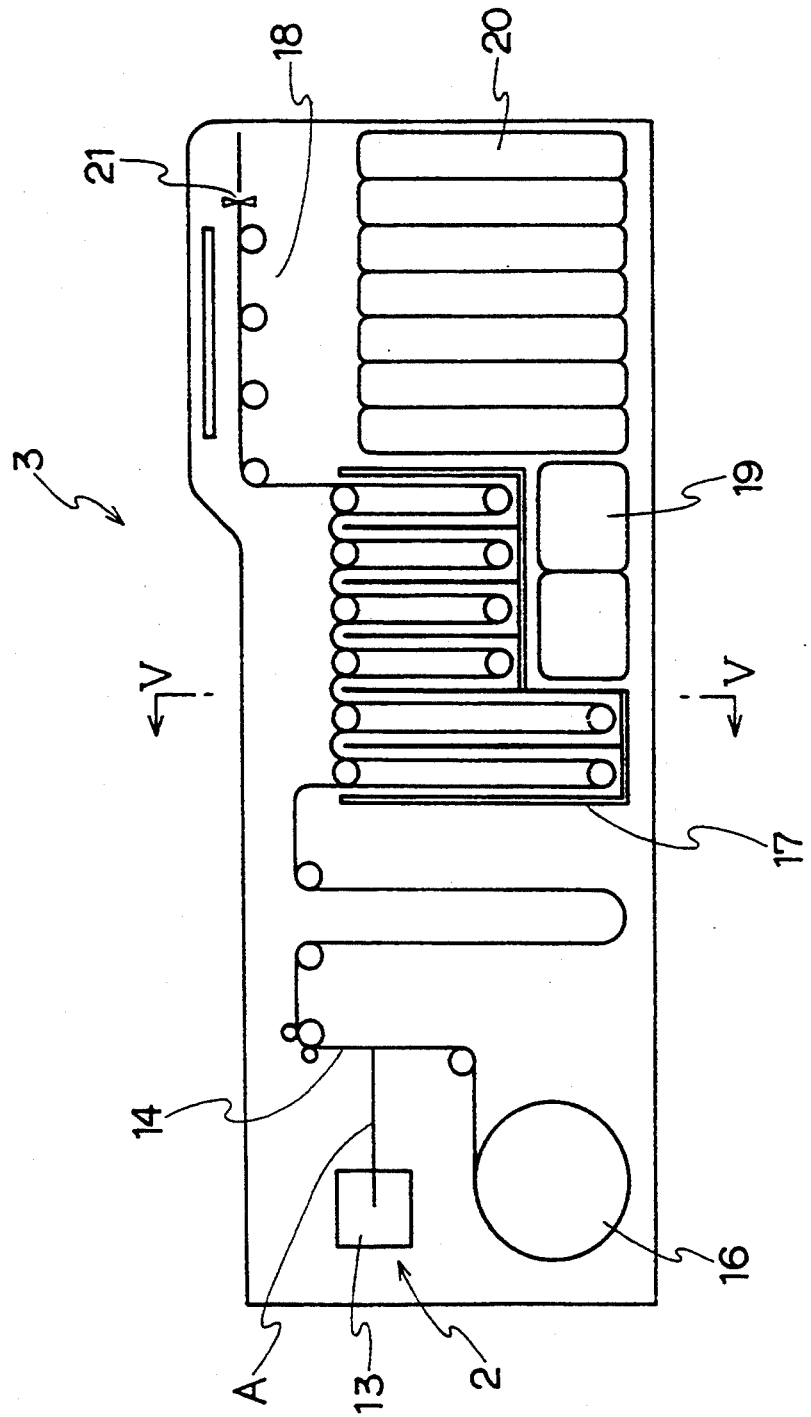
FIG. 3 is a sectional view taken along line III—III of FIG. 2.

The arrangement of each part will be described with reference to respective sectional view. FIG. 3 is a sectional view of the apparatus, taken along line III—III of FIG. 2, for illustrating the paper-developing part 3.

The paper-developing part 3 comprises a magazine 16 for holding the paper 14 in a rolled fashion, a processing tank 17 for sequentially performing developing, bleaching, fixing and stabilization, and a drying chamber 18 for drying the paper 14. The developer, bleaching agent and fixer within the processing tank 17 are appropriately replaced with flesh ones and drained into a waste liquid tank 19, while the replacing ones are supplied from a supply tank 20. The paper 14 drawn out of the magazine 16 is printed with a series of images of the film in the printing part 2 located in the upper left portion of the apparatus. Note that arrow A indicates the optical axis extending from the light source 9 (shown in FIG. 2). The paper 14 developed at the processing tank 17 is dried in the drying chamber 18, cut into individual frames by the cutter 21, and ejected to the order sorter 15 (shown in FIG. 2).

Figure 4:
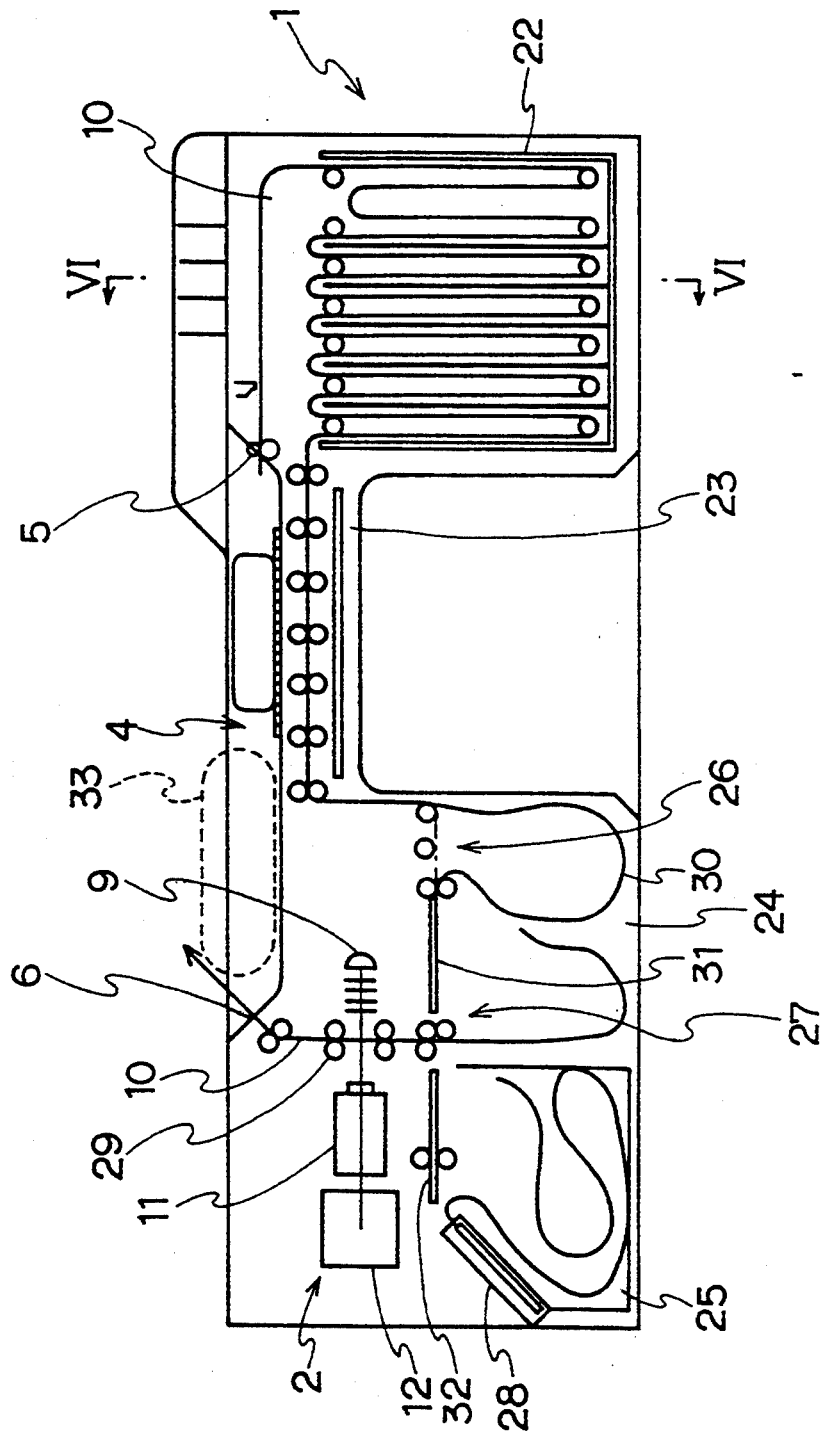
FIG. 4 is a sectional view taken along line IV—IV of FIG. 2.

FIG. 4 is a sectional view of the apparatus, taken along line IV—IV of FIG. 2, for illustrating the film-developing part 1.

The film-developing part 1 comprises a processing tank 22, a drying chamber 23, a film-standby tank 24 and a stocker 25. A film-standby mechanism 26 is located above and on the right-hand side of the film-standby tank 24. A film-sorting mechanism 27 is located between the film-standby tank 24 and the stocker 25. A leader-accumulating section 28 is located above and on the left-hand side of the stocker 25. The film 10 fed to the printing part 2 located in the upper left portion of the apparatus is exposed to light coming from the light source 9 through the mirror 12 thereby printing images of the film onto the paper in the paper-developing part 3 located on the rear side of the apparatus.

The film is attached with a leader at the leading end thereof, inserted into the film inlet 5 provided on the right end of the operation table 4, subjected to developing, bleaching, fixing and stabilization in the processing tank 22, dried in the drying chamber 23 and then fed to the film-standby mechanism 26. Where a succeeding film 30 cannot be fed to the printing part 2 since, for example, the roller 29 of the printing part 2 is rotated backwardly for extra-printing the preceding film 10, the film-standby mechanism causes the succeeding film 30 to sag down into the film-standby tank 24 and to temporarily stand by. When the printing part 2 becomes ready to process, a leader 31 first passes the film-sorting mechanism 27 and advances to the position of a leader 32.

The film-sorting mechanism 27 is provided with a sensor 47 to be described later (refer to FIGS. 9 to 11) by which the kind of film is detected. For example, film sizes includes 110, 126, 135 and 120 according to standard. When a film of the 126 or 120 size, of which the quantity is small relative to other sizes, is to be printed, there is a need to replace a negative mask with an alternative. On the other hand, a film of the 110 or 135 size, which requires no replacement of a negative mask, is detached from the leader 32, fed to the printing part 2 in the upper portion of the apparatus, subjected to printing thereat and then ejected from the film outlet 6, followed by being kept at a film stock position 33.

The film of the 126 or 120 size is fed to the stocker 25 with the leader 32 attached thereto. After the replacement of the negative mask, the film is inserted from the film outlet 6 by rotating the roller 29 of the printing part 2 backwardly and is then subjected to printing.

Figure 5:
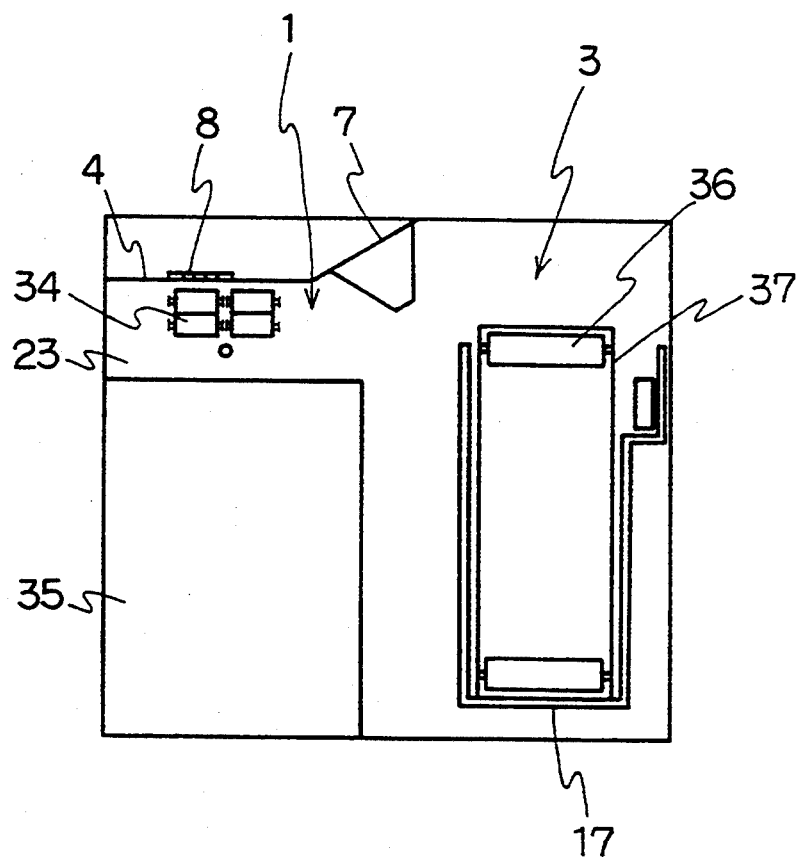
FIG. 5 is a sectional view taken along line V—V of FIG. 3.
Figure 6:
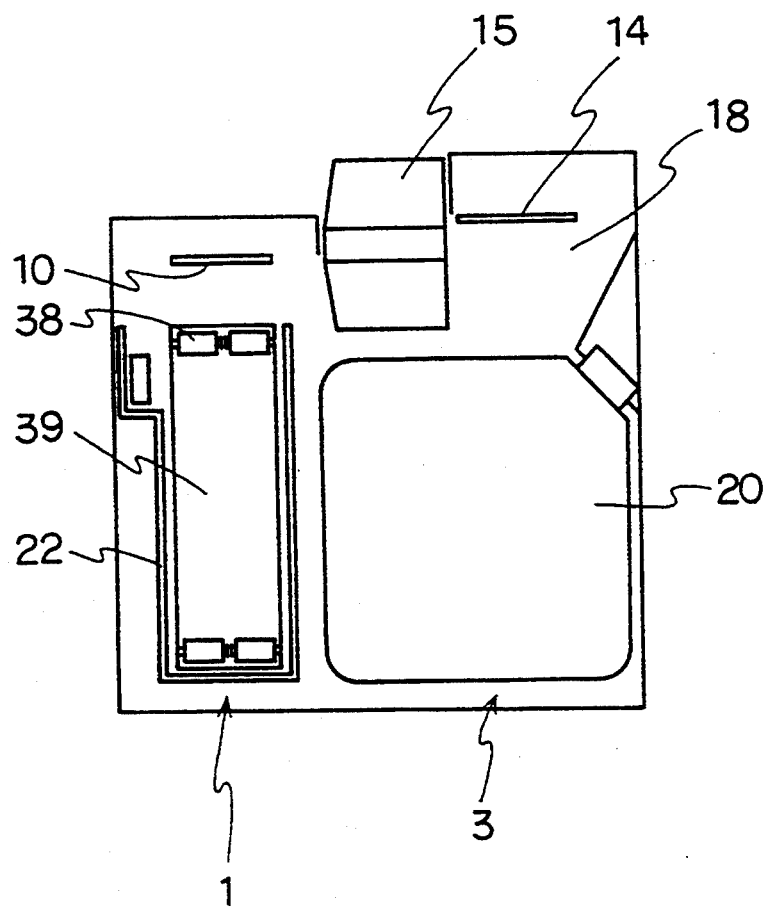
FIG. 6 is a sectional view taken along line VI—VI of FIG. 4.
Figure 7:
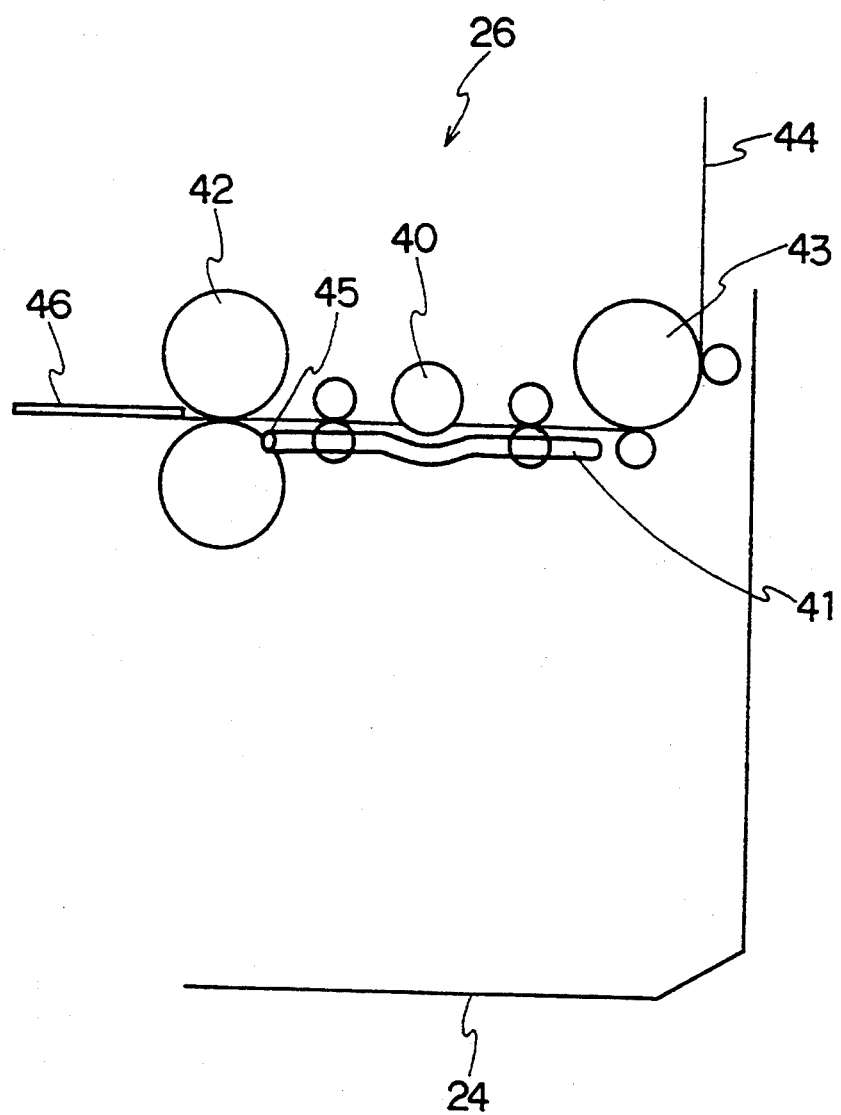
FIG. 7 is a schematic representation of the film-standby mechanism of FIG. 4.

FIG. 5 is a sectional view taken along line V—V of FIG. 3, and FIG. 6 is a sectional view taken along line VI—VI of FIG. 4.

Referring to FIG. 5, a drying chamber 23 of the film-developing part 1 is disposed below the operation table 4 and has a pair of juxtaposed rollers 34. Therefore, the film-developing part 1 permits two films to be developed simultaneously. A space 35 for operator's chair is defined below the drying section 23. On the right-hand side of the drawing, i.e., behind the operation table 4 the paper-developing part 3 is disposed. A rack 37 supporting paper feed rollers 36 is provided inside the processing tank 17.

Referring to FIG. 6, the processing tank 22 of the film-developing part 1 is disposed on the left-hand side and a rack 39 supporting film feed roller units 38 is provided within the processing tank 22. Each film feed roller unit 38 includes a pair of juxtaposed rollers, permitting two film to be fed simultaneously. The supply tank 20 of the paper-developing part 3 is installed on the right-hand side of the drawing. The drying chamber 18 is disposed above the supply tank 20. The paper 14 cut in the order sorter 15 is ejected to this drying chamber 18.

Next, the film-standby mechanism 26 and the film-sorting mechanism 27 will be described with reference to FIGS. 7 and 8, and FIGS. 9 to 12, respectively.

Figure 8:
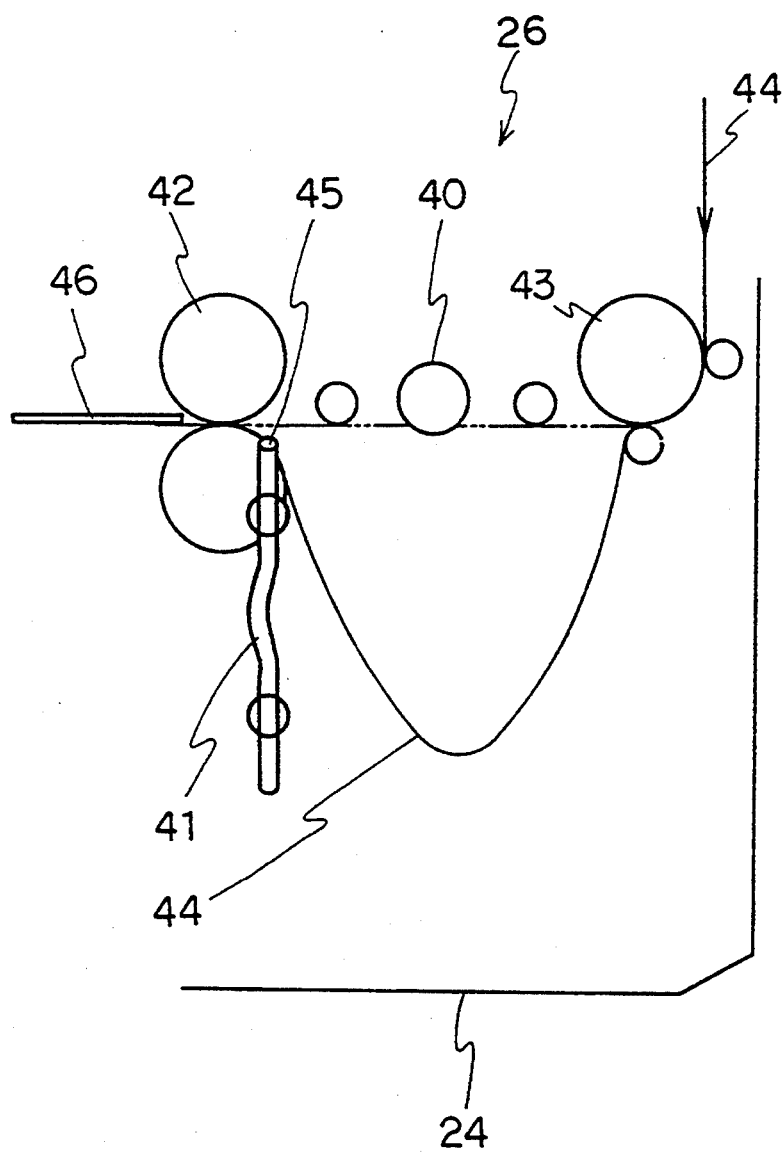
FIG. 8 is also a schematic representation of the film-standby mechanism of FIG. 4.

The film-standby mechanism 26 is disposed above the film-standby tank 24 and comprises a guide roller 40 and a guide plate 41. The guide roller 40 is rotatably fixed between film feed rollers 42 and 43. The guide plate 41 is disposed under the guide roller 40 so as to sandwich a film 44 therebetween and is downwardly pivotable around an axis 45. This allows a leader 46 to stand by at the position shown by stopping the feed roller 42 when the film 44 is unable to be fed to the printing part 2. The film feed roller 43, on the other hand, maintains its rotation, and the guide plate 41 pivotally downwardly moves around the axis 45, so that the film 44 fed from the processing tank 22 is made to sag down into the film-standby tank 24 disposed below the guide plate 41 and to stand by thereat, as shown in FIG. 8.

Figure 9:
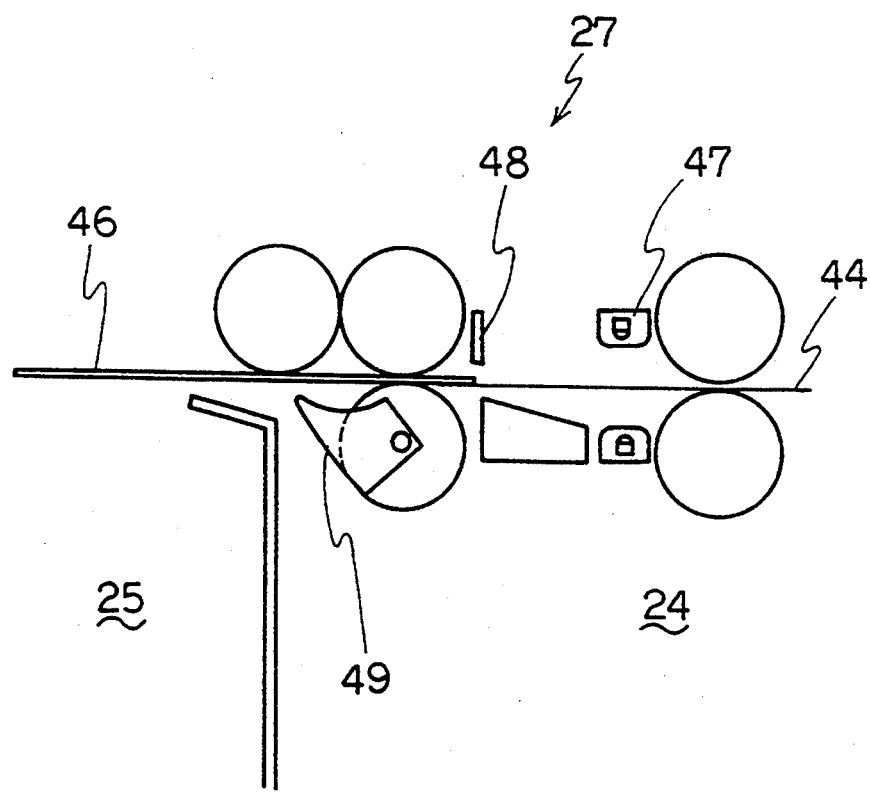
FIG. 9 is a schematic representation of the film-sorting mechanism of FIG. 4.
Figure 10:
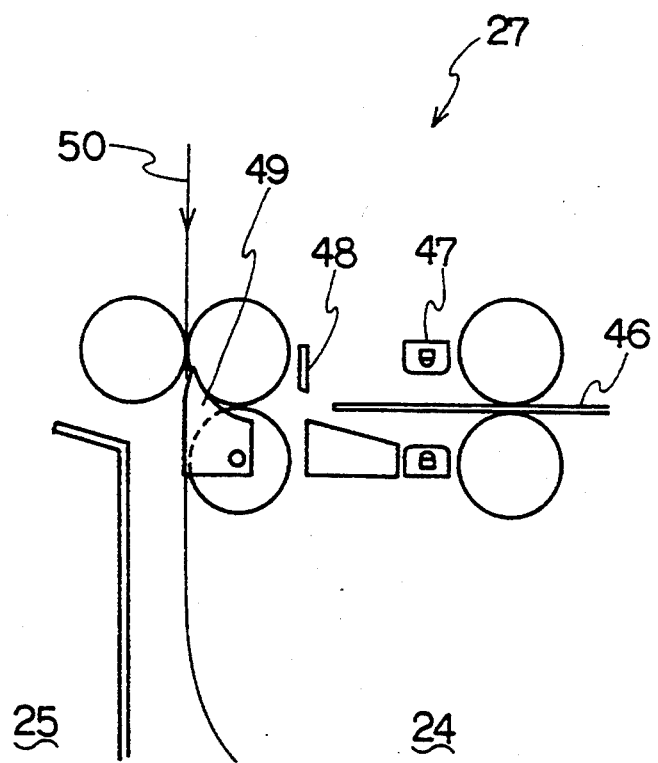
FIG. 10 is also a schematic representation of the film-sorting mechanism of FIG. 4.

As shown in FIG. 9, the film-sorting mechanism 27 comprises a sensor 47, a cutter 48 and a sorting guide 49. FIG. 9 illustrates the film-sorting mechanism 27 in the condition for extra-printing. A film 50 to be extra-printed is inserted through the film outlet 6 positioned above the film-sorting mechanism 27, set on a negative mask, and again ejected from the film outlet 6. During such operations the leader 46 is stopped at the position shown and the film 44 following the leader 46 is made to stand by within the film-standby tank 24. It should be noted that the film-standby tank 24 also plays a role of a space of relief for the film 50 to be extra-printed.

Figure 11:
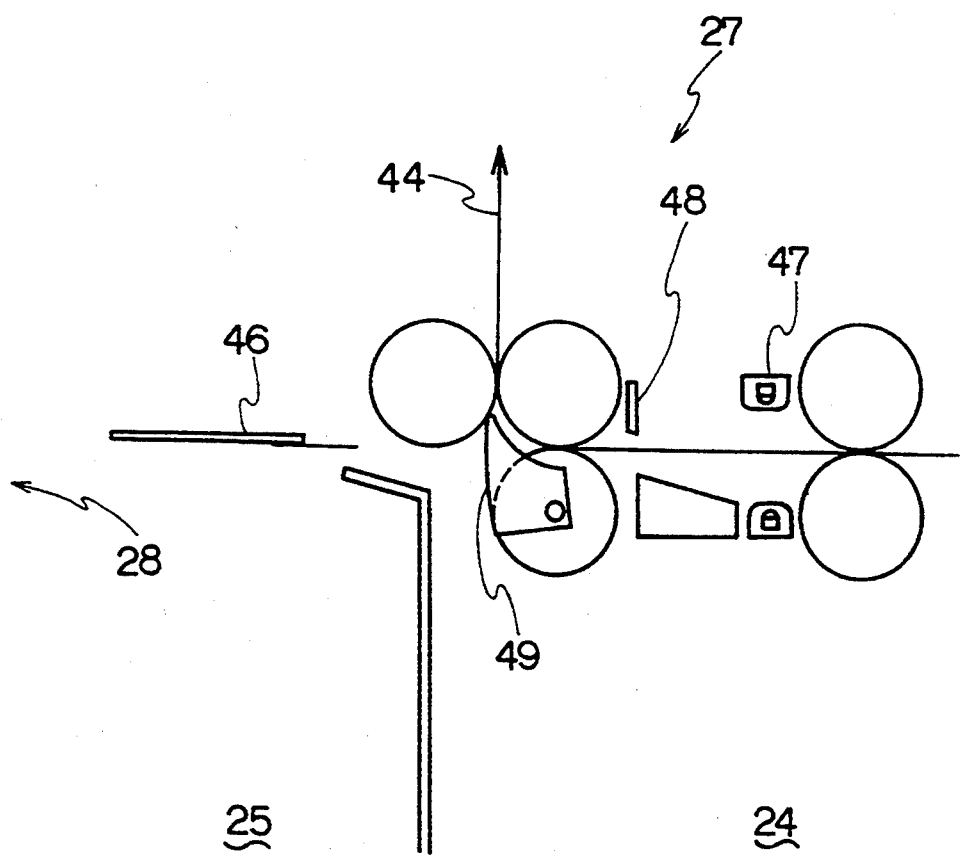
FIG. 11 is yet also a schematic representation of the film-sorting mechanism of FIG. 4.

When the extra-printing is terminated and the succeeding film 44 becomes ready to be fed to the printing part 2, the sorting guide 49 is slanted due to its pivotal movement, so that the leader 46 is made to advance to above the stocker 25. The sensor 47 detects the kind of the film 44 when the leading end of the film 44 passes therebelow. When the sensor 47 detects the size of the film to be 135 or 110, the cutter is actuated to detach the leader 46 from the leading end of the film 44. Immediately thereafter, the sorting guide 49 rises up to its initial position as shown in FIG. 11 thereby feeding the film 44 detached from the leader 46 to the printing part 2 (refer to FIG. 4) located above and adjacent the film-sorting mechanism 27. The leader 46 is transported to the leader-accumulating section 28 and is kept therein.

Since the printing part 2 is disposed adjacent the film-developing part 1 as described above, it is possible to feed the film to the printing part 2 immediately after the detachment of the leader. This results in a very shortened distance that the film is required to be transported relying upon its stiffness. Thus, the apparatus of the present invention assures a more stabilized figure of a film and a further enhanced processing speed than the conventional integral-type apparatus.

Figure 12:
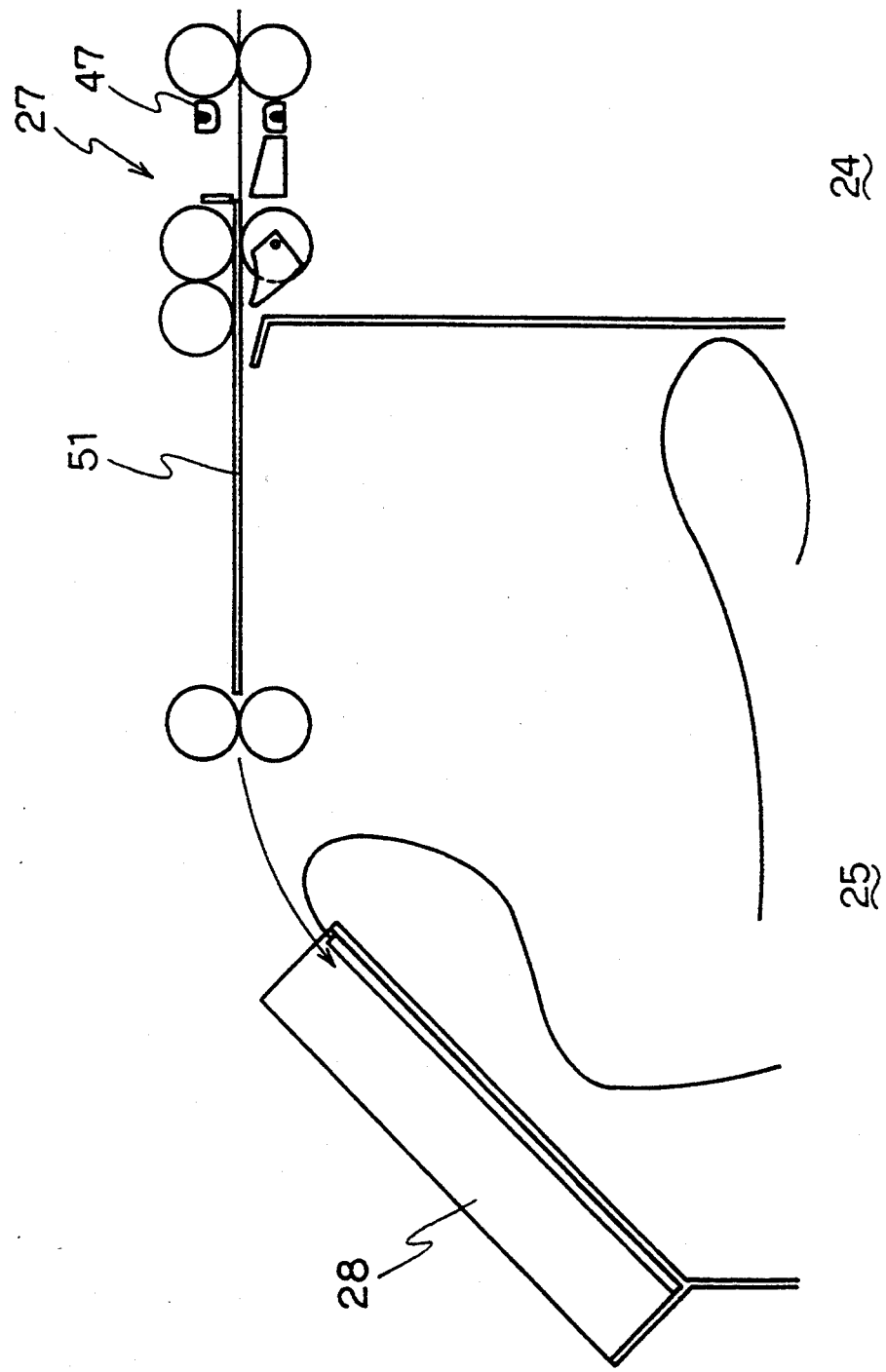
FIG. 12 is a schematic representation of the stocker of FIG. 4.

As shown in FIG. 12, the film of the 126 or 120 size, not detected by the sensor 47, is not detached from a leader 51 and is fed to the stocker 25 and kept therein at the same time the leader 51 is fed to the leader-accumulating section 28. If, for example a trouble occurs in the printing part 2 and the amount of film to be stood by exceeds the capacity of the film-standby tank 24, the film might be temporarily stored in the stocker 25.

Although the foregoing embodiment is adapted to detect films of the 135 and 110 sizes and sort these films, it is possible to sort other kinds of films.

As has been described, the apparatus for processing a photosensitive material is integrally constructed. This requires less space for its installation, and eliminates the labor for transporting a film from the film-developing device to the photo-printing device, thus realizing substantial laborsaving.

Further, the film-sorting mechanism sorts films into those of the type to be automatically photo-printed and those of the type to be manually photo-printed later on according to the kinds of the films. This assures an enhanced working efficiency of the apparatus.

Where the film-standby mechanism and standby tank are provided upstream of the sorting mechanism a film can be made to temporarily stand by when the printing part is unable to accept the film. Accordingly, there is no need to stop the film-developing part frequently.

Where the film inlet and film outlet are provided on the operation table, an operator carries out operations such as insertion of a film and extra-printing while being seated on a chair.

Further, the use of a leader for inserting a film into the film-developing part leads to a high-speed processing without damaging the film, enhanced working efficiency and minimized cost.

In addition, since a film having been developed is automatically fed to the printing part, there will result no occurrence an error in setting the film such as to insert the film upside down or to insert the film obliquely.

While only certain presently preferred embodiments have been described in detail, as will be apparent with those familiar with the art, certain changes and modifications can be made without departing from the spirit and scope of the invention as defined by the following claims.

What is claimed is:

1. An apparatus for processing a photosensitive material comprising:
   a film-developing part for developing individual films while feeding each of the films accompanying a leader;
   a printing part for subjecting a photographic paper to an exposure;
   a paper-developing part for developing the photographic paper exposed; and
   a film-sorting mechanism, disposed adjacent a terminating end of the film-developing part, for sorting the films by the kinds thereof.

2. The apparatus of claim 1, further comprising a film-standby mechanism for causing the films to stand by for sorting and a standby tank for accommodating the films standing by, the film-standby mechanism and the standby tank being disposed upstream of said film-sorting mechanism of said film-developing part, whereby the feeding of the films is temporarily stopped so as to make the films stand by when the films are impossible to feed to said printing part.

3. The apparatus of claim 1, wherein said film-developing part and said printing part have a film inlet and a film outlet, respectively, on an operation table of the apparatus.

4. The apparatus of claim 1, wherein said film-sorting mechanism comprises a sensor for detecting the kinds of the films, a cutter for detaching each of the films detected by the sensor from the leader, and a sorting guide for guiding each film detached from the leader by the cutter toward said printing part.

5. The apparatus of claim 2, wherein said film-standby mechanism comprises a guide roller rotatably fixed at a location above said standby tank, and a guide plate disposed under the guide roller and movable toward and away from the guide roller, whereby when the guide plate is caused to move away from the guide roller, the film is allowed to sag down into said standby tank and to stand by therewithin.

* * * * *